United States Patent [19]
Ott

[11] Patent Number: 4,967,379
[45] Date of Patent: Oct. 30, 1990

[54] PROCESS FOR THE INK CONTROL OR REGULATION OF A PRINTING MACHINE BY COMPARING DESIRED COLOR TO OBTAINABLE COLOR DATA

[75] Inventor: Hans Ott, Regensdorf, Switzerland

[73] Assignee: GRETAG Aktiengesellschaft, Regensforf, Switzerland

[21] Appl. No.: 279,776

[22] Filed: Dec. 5, 1988

[30] Foreign Application Priority Data

Dec. 16, 1987 [CH] Switzerland ........................ 4922/87

[51] Int. Cl.$^5$ ........................................ G01N 21/25

[52] U.S. Cl. .................................. 364/526; 101/211; 101/365

[58] Field of Search ............... 364/526, 525, 578, 471, 364/573; 356/425, 421, 407, 402; 101/365, 211, 171

[56] References Cited

U.S. PATENT DOCUMENTS

| | | | |
|---|---|---|---|
| 3,322,025 | 5/1962 | Dauser . | |
| 3,958,509 | 5/1976 | Murray et al. | 101/426 |
| 3,995,958 | 12/1976 | Pfahl et al. . | |
| 4,003,660 | 1/1977 | Christie, Jr. et al. | 356/407 |
| 4,076,421 | 2/1978 | Kishner . | |
| 4,151,796 | 5/1979 | Uhrig | 101/142 |
| 4,183,657 | 1/1980 | Ernst et al. | 355/44 R |
| 4,185,920 | 1/1980 | Suga | 356/406 |
| 4,200,932 | 4/1980 | Schramm et al. | 364/519 |
| 4,210,078 | 7/1980 | Greiner et al. | 101/136 |
| 4,210,818 | 7/1980 | Green et al. | 250/559 |
| 4,217,648 | 8/1980 | Thurm et al. | 364/526 |
| 4,256,131 | 3/1981 | De Remigis | 137/3 |
| 4,289,405 | 9/1981 | Tobias | 356/407 |
| 4,309,496 | 1/1982 | Miller | 430/30 |
| 4,310,248 | 1/1982 | Meredith | 356/402 |
| 4,390,958 | 6/1983 | Mamberer | 101/365 |
| 4,403,866 | 9/1983 | Falcoff et al. | 366/132 |

(List continued on next page.)

FOREIGN PATENT DOCUMENTS

| | | |
|---|---|---|
| 1199521 | 1/1986 | Canada . |
| 1206803 | 7/1986 | Canada . |
| 069572 | 12/1983 | European Pat. Off. . |
| 2012213 | 7/1979 | United Kingdom . |
| 2071573 | 9/1981 | United Kingdom . |

OTHER PUBLICATIONS

CIE "Recommendation on Uniform Color Spaces--Color Difference Equations Psychometric Color Terms" Supp. No. 2 to CIE Publ. No. 15 (E-1.3.1) 1971.
International Standard "Photography-Density Measurements Part 3: Spectral Conditions" First Editon 1984-08-15 UDC 771.534.531.
"A New Color Control System for Gravure" (Brand et al.) May 1987.
"Spectrophotometric Instrumentation for Graphic Arts" (Celio, 1988 TAGA Proceedings).

*Primary Examiner*—Parshotam S. Lall
*Assistant Examiner*—S. A. Melnick
*Attorney, Agent, or Firm*—Burns, Doane, Swecker & Mathis

[57] ABSTRACT

In a process for the ink control or regulation of a printing machine the actual color coordinates of measuring fields are compared with the desired color location. If the desired color location is found outside the correction color space defined by the boundary values of the full tone densities of the printing inks, as a substitute for the given desirable color locations, attainable desired color locations are determined on the surface of the correction color space by finding the point on the surface of the color correction space that is nearest to the given desired color location. The search for the nearest point may also be carried out in a manner such that the nearest point on the surface of the correction color space is sought in the direction of the brightness axis of the color space. If in the process, a boundary value of the brightness error is reached, the attainable desired color location is determined beginning at the desired color location displaced along the brightness axis to the maximum permissible brightness error.

29 Claims, 4 Drawing Sheets

U.S. PATENT DOCUMENTS 4,439,038 3/1984 Mactaggart ........................ 356/408
4,488,808 12/1984 Kato ........................ 356/73
4,494,875 1/1985 Schramm et al. ........................ 356/402
4,505,589 3/1985 Ott et al. ........................ 356/402
4,510,866 4/1985 Sekizawa et al. ........................ 101/365
4,527,897 7/1985 Okabe ........................ 356/402
4,535,413 8/1985 Siota et al. ........................ 364/526
4,539,647 9/1985 Kaneko et al. ........................ 364/526
4,541,336 9/1985 Bernauer ........................ 101/211
4,553,033 11/1985 Hubble, III et al. ........................ 250/353
4,561,103 12/1985 Horiguchi et al. .
4,586,148 4/1986 Rehder et al. ........................ 364/550
4,649,502 3/1987 Keller et al. ........................ 364/579
4,660,159 4/1987 Ott ........................ 364/526
4,665,496 5/1987 Ott ........................ 364/526
4,667,596 5/1987 Dotzel et al. ........................ 101/211
4,671,661 6/1987 Ott ........................ 356/402
4,706,206 11/1987 Benoit et al. ........................ 364/526
4,717,954 1/1988 Fujita et al. ........................ 358/80
4,745,555 5/1988 Connelly et al. ........................ 364/526 X
4,752,892 6/1988 Lecha ........................ 364/526 X
4,813,000 3/1989 Wyman et al. ........................ 364/526
4,852,485 8/1989 Brunner ........................ 101/211
4,884,221 11/1989 Sugiyama et al. ........................ 364/526

PROCESS FOR THE INK CONTROL OR REGULATION OF A PRINTING MACHINE BY COMPARING DESIRED COLOR TO OBTAINABLE COLOR DATA

BACKGROUND OF THE INVENTION

The invention concerns a process for the ink control or regulation of a printing machine having a colorimetric measuring system, whereby measuring fields on sheets printed by the printing machine are optically evaluated, in order to determine the color location of a measuring field in a color coordinate system and to produce a regulating value for the adjustment of the color control elements of the printing machine by coordinate comparison from the color deviation of the measuring field evaluated from a given desired color location, so that undesirable color deviations will become minimal on the sheet subsequently printed with the new ink control setting.

A process of the aforementioned type is already known from EP-A No. 228 347 (corresponding to U.S. application Ser. No. 939,966 filed Dec. 10, 1986 and Ser. No. 213,000, filed June 29, 1988), in which for the optimum matching of the color effect a plurality of reference fields are evaluated, in order to compare the color location of the reference field scanned with a color location predetermined for said reference field and to determine a layer thickness variation control vector from the color deviation between the actual color location and the desired color location, whereby the ink control elements of the printing machine are adjusted so that the smallest possible color deviation is achieved. However, occasionally it is not possible in view of certain predetermined boundary conditions, in particular given minimum and/or maximum layer thicknesses of the printing inks, to shift the actual color location to the predetermined desired color location. In such cases a color deviation error, which can be perceived to a greater or lesser extent, remains since the predetermined desired color location is outside the correction color range, the dimensions of which are determined by the permissible variation of the layer thicknesses or full tone thicknesses of the printing inks involved.

An apparatus and a process for the determination of the necessary screen surface coverage of color extracts for providing reproduction of a given master pattern to be printed with the highest possible accuracy, is described in EP-A- No. 124,908. The known apparatus comprises a measuring head, which for example contains filters for the colors red, green and blue. The apparatus makes it possible to measure color information with the use of said filters, in particular color densities of the masters scanned. The measuring head is connected with a data processing apparatus equipped with a keyboard used in the scanning of the given reference patterns for the entering of screened surface coverage values in percentages. The data processing apparatus is further provided with a display device to display the screened surface coverage values calculated on the basis of the scanning of a matter pattern.

Before it is possible to use the known apparatus for the determination of screened surface coverages of a set of color extracts, it is necessary to prepare a conversion table for the conversion of color information into screened surface coverage values, which are then stored in a memory of the data processing apparatus. For this purpose, a color sample card is initially printed. The colors cyan, magenta, yellow and black are used in the printing of the color sample card, wherein the screened surface coverages are applied between 0% and 100% in steps of 10% each, for all of the colors. This yields 14,641 combinations for the screened surface coverages and the corresponding color information, expressed for example as ink densities.

During the scanning of each pattern of the color sample card, the combination of the screened surface coverages used is entered by means of the keyboard and correlated with the color densities determined by the measuring head.

If the conversion table is applied, the apparatus is able to scan a sample pattern to be printed by means of the measuring head and to determine, by comparing the color densities measured using the assistance of the different filters with the color densities stored in the conversion table, the particular line in the conversion table having color density values which coincide with the measured color densities of the master pattern or provide the best agreement. When this line has been found in the conversion table, the correlated degrees of screened surface coverage, for example, three or four color extracts, are displayed on a display device or passed to an external device.

Because the screened color coverages for the printing were changed in steps of 10% in the preparation of the color sample card, the conversion table is relatively coarse and inaccurate. For this reason, according to an improved process, additional intermediate values are determined for color information and the correlated screened surface coverages by the interpolation of values of the conversion table. The interpolation may be carried out in a manner such that grid steps of 1% are provided, which results in a more accurate reproduction of the master pattern to be printed.

In the data processing apparatus, the color deviations between the color information of the master pattern and the color information contained in the conversion table are determined by computation to determine the screened surface coverages. The known process may also be effected so that prior to the output of the values for the degrees of screened surface coverage, a query is carried out relative to whether values of 0% or 100% are present. By extrapolating the degrees of screened surface coverage and the color densities, an extended color range for screened surface coverages between −10% and 110% is determined on the basis of the color density variations in a zone of 0 to 10% and 90 to 100%. The known process makes it possible in this manner to produce a statement concerning the lack of reproducibility of a master pattern.

SUMMARY OF THE INVENTION

Based on this state of the art, it is the object of the invention to provide a process which makes it possible to achieve the highest possible printing quality even if the predetermined desired color location is outside the correction range limited by the given boundary conditions.

This object is attained according to the invention by determining a correction color space around the actual color location measured on the measuring field with the aid of predetermined boundary densities and the measured full tone densities. A predetermined desired color location situated outside the correction color space is replaced by an attainable desired color location on the boundary surface of the correction color space having a color deviation from the predetermined desired color location, with the components of said deviation essential for the printing quality being minimal.

Because the unattainable predetermined desired color location is replaced in keeping with a control strategy by an attainable desired color location, it is becoming possible to aim at an optimum position in the color coordinate space for the actual color location. In the simplest case, the color location defined by the intersection of a color deviation vector, which extends between the actual color location and the desired color location, with the surface of the color correction body is chosen as the attainable desired color location. However, it is more advantageous to choose as the attainable desired color location the location on the surface of the correction color space having the smallest deviation from the predetermined desired color location. Depending on the position of the predetermined desired color location, the attainable desired color location may be found by directing a perpendicular onto the surface of the color correction space through the predetermined desired color location. If this does not lead to a solution, a perpendicular is directed at the nearest lateral edge. If this again is not possible, the nearest corner of the color correction space is the nearest point.

If a color space with a brightness coordinate axis is used as the color space, it is convenient to trade a larger brightness error for a smaller color tone error, as brightness errors have a lesser effect on printing quality than color tone errors. The calculation of the attainable desired color location is carried out according to this strategy by choosing as the attainable desired color location the intersection of a parallel to the brightness coordinate axis through the predetermined desired color location with the surface of the correction color space nearest to the predetermined desired color location.

If no such intersection exists, it is convenient to proceed in keeping with, for example, a control strategy whereby for the points located on a parallel to the brightness coordinate axis through the predetermined desired color location within a given brightness error range having a maximum and a minimum brightness, the nearest points on the surface of the correction color space are designated as the attainable desired color locations. The nearest point on the surface of the correction color space is determined as the point on the parallel associated with the greatest brightness error which appears to be acceptable.

BRIEF DESCRIPTION OF THE DRAWINGS

Other objects and advantages of the present invention will become apparent from the following detailed description of preferred embodiments as described in conjunction with the accompanying drawings in which.

DETAILED DESCRIPTION OF THE PREFERRED EMBODIMENTS

Figure 1:
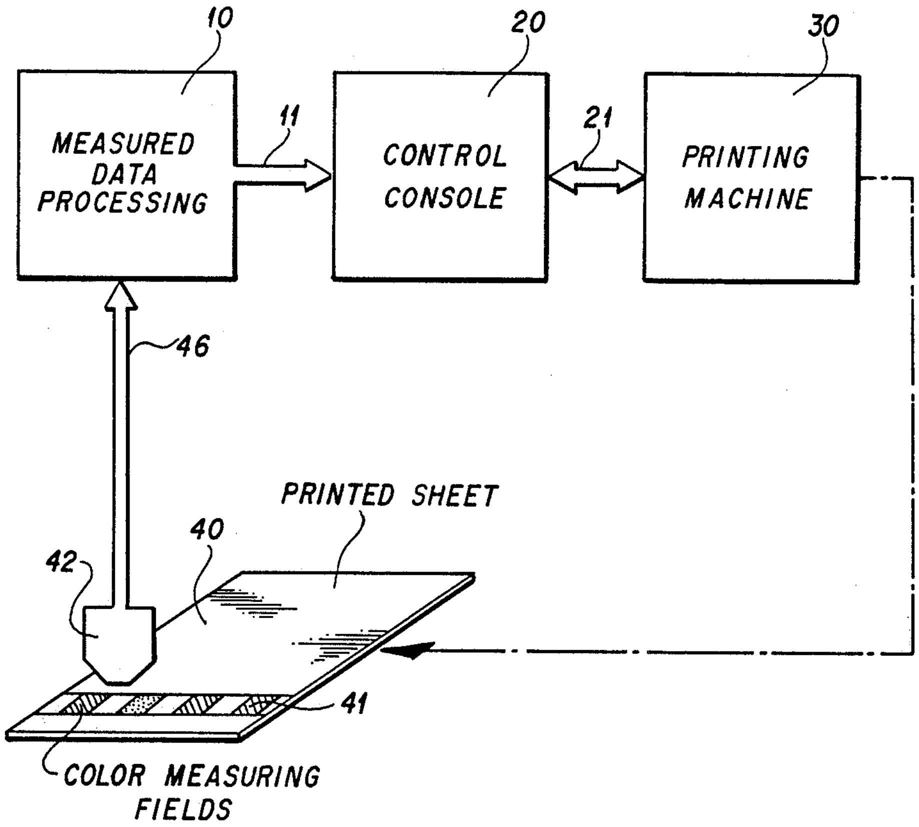
FIG. 1 shows a simplified block diagram of a printing machine to carry out the control strategy according to the invention.

FIG. 1 shows a closed control system of a printing installation comprising an electronic apparatus 10 for the processing of measured values, in order to produce control data 11 to be introduced into a control console 20, which produces setting signals 21 from the control data 11 for the ink control elements of a printing machine 30, which for example may be a multicolor offset printing machine. (For what follows, only the colors cyan, magenta and yellow are relevant) The control loop of the printing installation is used to maintain the color deviations on the printed sheet 40 printed by the printing machine 30 as small as possible relative to the predetermined desired colors.

The colors on the printed sheet 40 are evaluated by the measuring of color measuring fields 41 of color measuring strips printed with the sheet, said strips being scanned automatically and continuously, preferably colorimetrically and/or densitometrically, by means of a measuring head 42.

The color measuring apparatus yields densitometric measured values of single color full tone measuring fields and colorimetric measured values of single or multicolor measuring fields, from which a computer in the measured data processing apparatus 10 determines, with the aid of predetermined density boundary values from the measured full tone densities, the correction color space around the actual color location I measured on the multicolor measuring field in the L*a*b* color space (CIE 1976). Although other color spaces may also be used, the invention is explained relative to the L*a*b* color space, which represents a color system uniformly spaced relative to perception, in which identical deviations are recognized equally in the three coordinates (delta L*, delta a* or delta b*). However, for the evaluation of printing quality, these deviations are not equivalent, as the brightness deviations (in the direction of the L* coordinate) have a lesser detrimental effect than deviations of equal magnitude in the coordinates a* and b* correlated with color.

If the data processing apparatus 10 finds that the actual color location of the zone scanned by the color measuring device 42, in particular of a color measuring field 41 on the printed sheet 40, does not coincide with the desired color location which had been determined, for example, by scanning a printed sheet found to be satisfactory or by directly entering data, the data processing apparatus 10 produces the control data 11. The control data 11 are entered through the control console 20 and generate the adjusting signals 21 for the ink control elements of the printing machine 30, in order to adjust the layer thicknesses of the printing colors on the printed sheet 40 and thus the full tone densities, so that when the next printed sheet 40 is measured, the actual color location I and the desired color location S are coinciding or at least approaching each other.

In the data processing apparatus 10, the computer multiplies the color deviation vectors by a sensitivity matrix in order to compute the layer thickness variation control vector or the density variation vector, which must be taken into account in the printing of the next printed sheet 40, in order to obtain the color location displacement desired. The sensitivity matrix, whereby the density differences for the color location displacement between the desired color location S and the actual color location I are calculated, may be determined empirically and by measurements in an experimental series.

More details relative to the empirical/measuring determination of the sensitivity matrix may be found in the two U.S. application Ser. Nos. 939,966 and 213,000, corresponding to EP-A No. 228,347. The determination by computation is described in detail in the Swiss application Nos. 120/88 of Jan. 14, 1988 and 1268/88 of Apr. 6, 1988 (corresponding to the U.S. application Ser. No. 293,528 of Jan. 5, 1989). The disclosures of the aforecited references and applications are hereby incorporated by reference.

Figure 2:
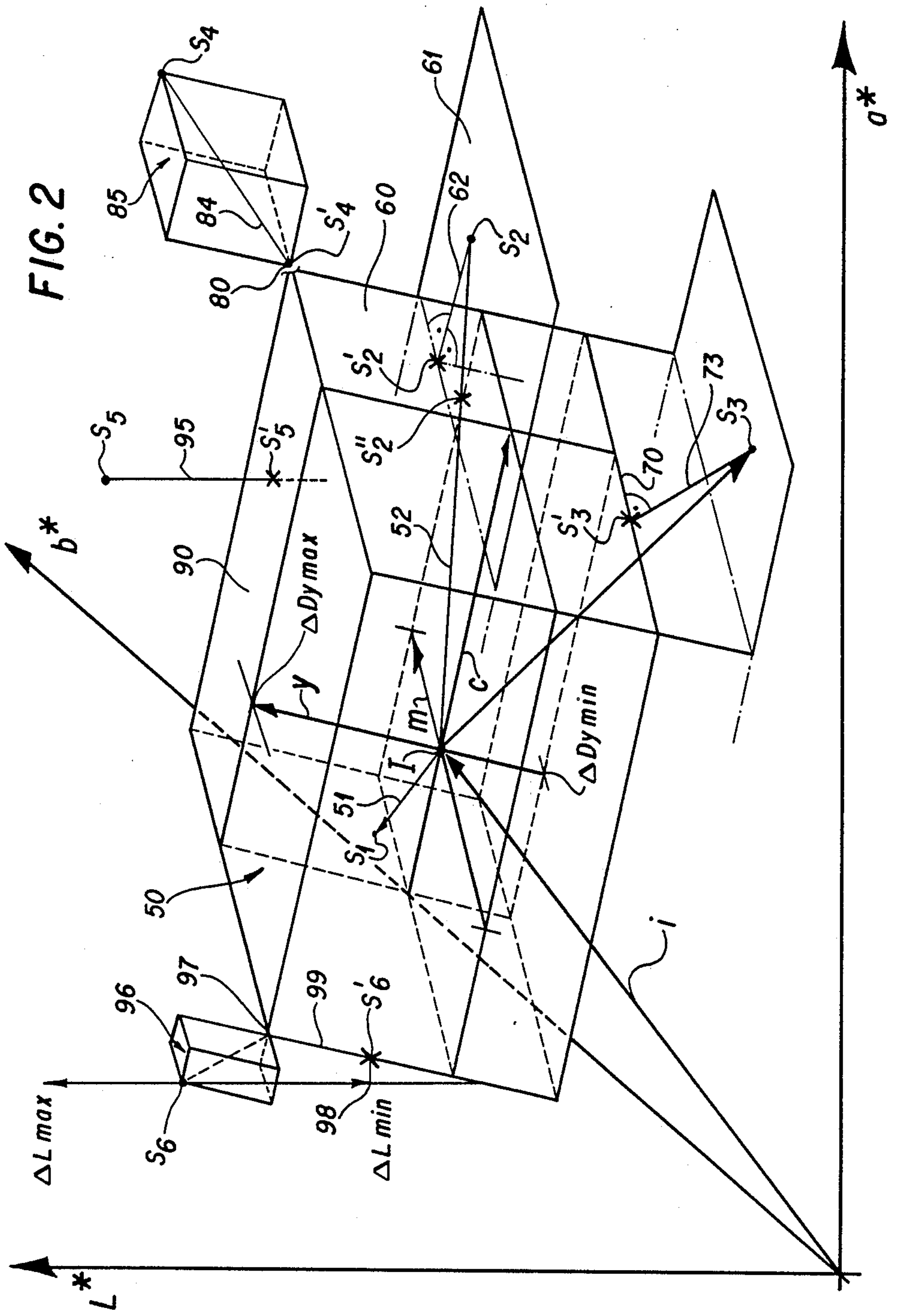
FIG. 2 shows a summary representation of the control strategy according to the invention with a correction control space within a color space having a coordinate axis correlated to brightness, and two coordinate axes correlated to color saturation and color tone

FIG. 2 shows the L*a*b* color space with color vector i for the actual color location of a zone scanned on the printed sheet 40, in particular a color measuring field 41, which may be a gray field or another half-tone or full tone field especially adapted to the image content of the printed sheet 40, in order to carry out an optimum correction of the color and brightness components simultaneously.

Based on the actual color location shown in FIG. 2, it is possible to carry out by means of the full tone changes delta $D_C$, delta $D_M$ and delta $D_Y$, alterations of the printed color location corresponding to the directions of the correction vectors c, m and y shown in FIG. 2 within a correction color space 50, which is represented as an ashlar in FIG. 2. It is known that in multicolor printing the color location is determined roughly by half-tone surface coverage, while fine matching is carried out by varying thicknesses, i.e. by changing the layer thicknesses of the printing inks. In keeping with the full tone density boundary values, the correction vectors c, m and y are limited. For the correction vector y, in FIG. 2 the maximum permissible density differences delta $D_{ymax}$ and delta $D_{ymin}$ are shown. The permissible maximum density differences are obtained from the differences between the actual density $D_I$ and the permissible boundary densities $D_{max}$ and $D_{min}$ for the printing inks involved. The boundary values for the full tone density are obtained for example from the requirement of an adequate relative print contrast.

The correction vectors c, m and y delimit the correction color space 50 around the instantaneous actual color location I. Even though they are usually not at right angles to each other, they are shown in this manner in FIG. 2 for the sake of simplicity. It is assumed further that within a sufficiently small correction color space around the actual color location a linear approximation of the relationships between the color location coordinates and the densities is given.

Figure 3:
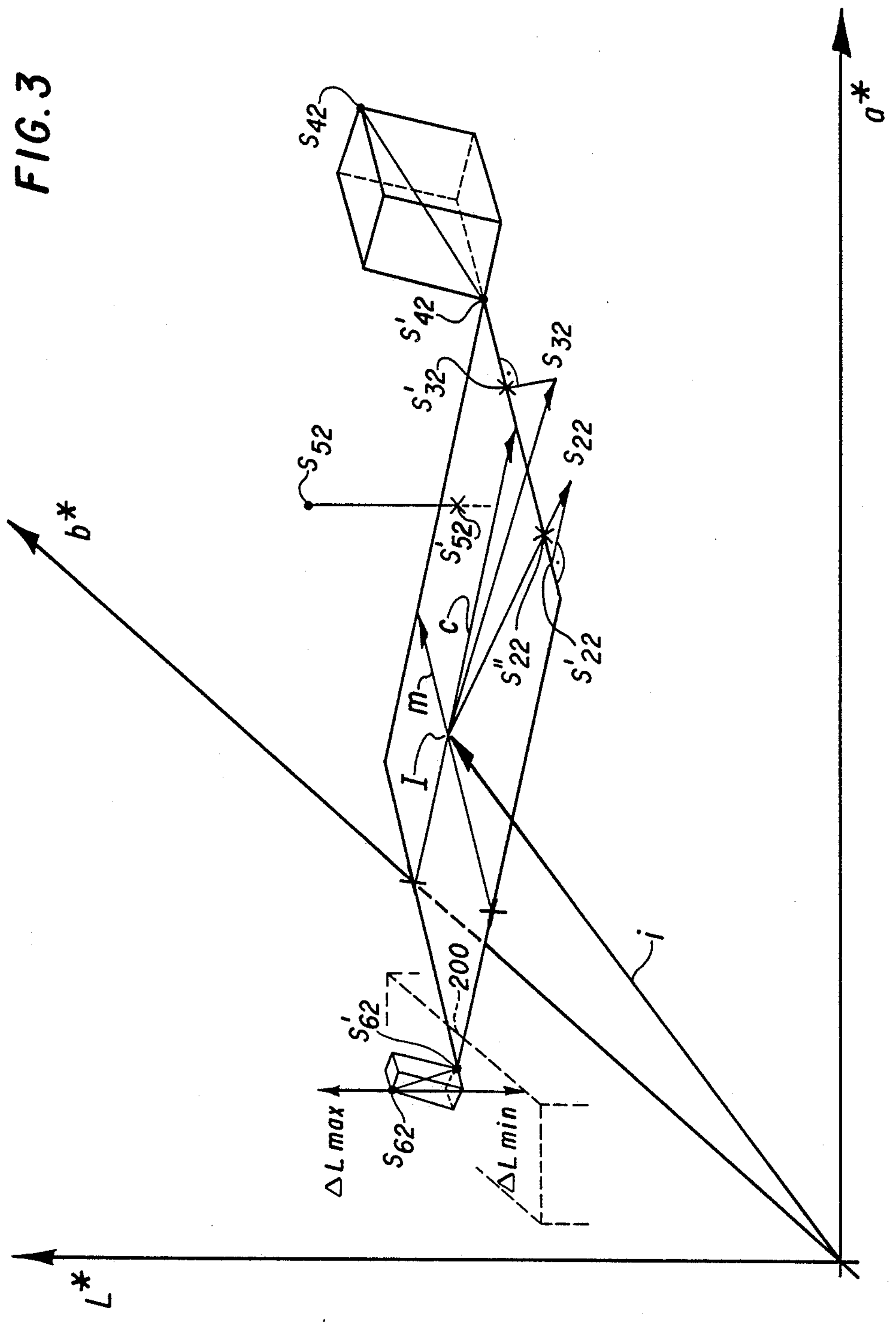
FIG. 3 shows a summary representation of the control strategy according to the invention for a surface defined by the vectors m and c in FIG. 2.
Figure 4:
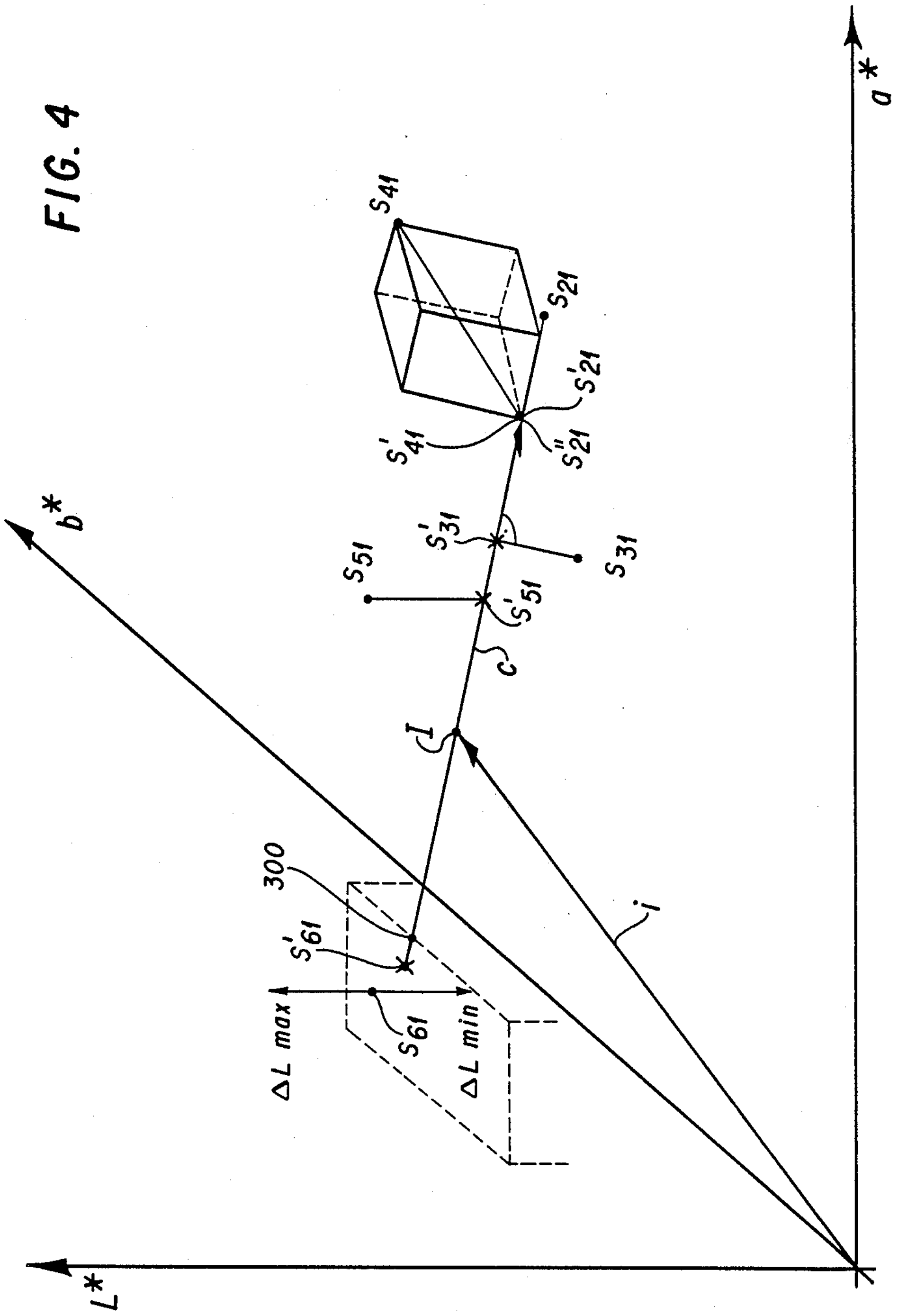
FIG. 4 shows a summary representation of the control strategy according to the invention for a straight line c of the FIG. 2 color space.

Together with the colorimetrically measured actual color location I in FIG. 2, the desired color locations $S_1$ to $S_6$ are entered to illustrate the control strategy according to the invention; they represent a special case and obviously only one of them is the predetermined desired color location S, which should have been attained in printing the printed sheet 40. Corresponding color location $S_{22}$ to $S_{62}$ are shown in FIG. 3 for a parallelogram of the FIG. 2 color space. Further, corresponding color locations $S_{21}$ to $S_{61}$ (corresponding to points $S_1$ to $S_6$) are shown in FIG. 4 for the case when the color space of FIG. 2 is reduced to a single line.

As a first example, the case wherein the desired color location is $S_1$ will be discussed. The color variation from the actual color location I is given by the color deviation vector 51, and is located within the correction color space 50, representing a control body. By varying the ink densities of the printing inks involved within the predetermined boundary values, it is therefore possible to actually attain the desired location $S_1$, wherein by means of the aforementioned sensitivity matrix A the density differences for the color location displacement delta L, delta a and delta b between the actual color location I and the desired color location $S_1$ are calculated.

In the following, regulating strategies are explained for cases in which a desired color location S cannot be attained in view of the given ink density limitations or other restrictions. In these cases, a substitute desired color location, i.e., an attainable desired color location S′ or S″ is aimed at, said location being characterized by the least color deviation perceivable by the observer. Corresponding attainable desired colors locations S′ or S″ are shown in FIGS. 3 and 4 for the reduction of the FIG. 2 color space to a surface and to a single line, respectively.

If the desired color location Si (i being an index for color location) is located outside the correction color space 50, it is possible to select as the attainable desired color location S″ the piercing point of the color deviation vector through the lateral surface or boundary surface of the color correction space 50 involved. FIG. 2 shows how, in this manner, in the case of a desired color location $S_2$, an attainable desired color location $S_2''$ is obtained. The attainable desired color location $S''_2$ is located on the intersection of the color deviation vector 52 with the lateral surface 60 of the correction color space 50. The strategy of selecting the piercing point of the color deviation vector between the actual color location and the desired color location has the advantage of a simplified calculation and represents an approximation.

The deviation seen in FIG. 2 between the desired color location $S_2$ and the attainable desired color location $S''_2$ represents the uncorrected or noncorrectable color deviation. As the desired color location $S_2$ is located in a spatial area having spatial points for which a perpendicular onto the lateral surface 60 exists, a smaller noncorrectable color deviation is obtained, corresponding to the length of the perpendicular 62 onto the lateral surface 60, if the foot of the perpendicular 62 on the lateral surface 60 is chosen as the attainable desired color location $S'_2$. FIG. 2 shows the right angles and the plane 61, in which the perpendicular 62 and the desired color location $S_2$ are located, together with the attainable desired color location $S'_2$. In order not to overload the drawing, the color deviation vector between the actual color location I and the attainable desired color location $S'_2$ is not shown. When by means of the computer the attainable color correction location $S'_2$ has been determined by the analytical determination of the minimum distance from the correction color space 50, the necessary density difference vector is calculated using the sensitivity matrix A.

The shortest distance between the desired color location $S_2$ and the nearest boundary surface of the correction color space 50, i.e., the lateral surface 60, was determined in the described exemplary embodiment by locating the foot of a perpendicular 62. Depending on the position of the desired color location, it may however, not be possible to establish a perpendicular on one of the boundary surfaces of the correction color space 50. In such cases, the point with the shortest distance to the desired color location S is determined in another manner.

If the desired color location is displaced to the extent that it is located outside the spatial area for the points whereof a perpendicular onto the adjacent lateral surface 60 exists, as is true for example for the desired color location $S_3$, an attainable desired color location $S'_3$ is determined by establishing the perpendicular 73 onto the adjacent edge 70 of the correction color space 50, and selecting the intersection of the perpendicular 73 with the edge 70 of the correction color space 73 as the attainable desired color location $S'_3$.

The desired color location $S_4$ in FIG. 2 is located at a point, which permits neither the establishment of a perpendicular onto a lateral surface nor onto an edge of the control body or correction color space 50. For this reason, the adjacent corner 80 of the correction color space 50 is chosen as the attainable desired color location $S'_4$ since the latter point has the shortest distance of all of the points on the surface of the correction color space 50 from the desired color location $S_4$. The distance of the attainable desired color location $S'_4$, determined in this manner from the desired color location $S_4$ proper, is indicated in FIG. 2 by the connecting line 84, with an ashlar 85 being drawn to illustrate the spatial position of the desired color location $S_4$, the diagonal of which is formed by the connecting line 84.

Experience shows that brightness deviations have a lesser detrimental effect than deviations of the two other coordinates of equal magnitude, so that larger brightness deviations may be accepted in favor of smaller color component deviations. A simple method to accomplish this consists of a linear compression of L* according to the equation $$L^{**}=K \cdot L^{*}$$

with the compression factor K being between zero and one.

In this manner, color component errors may be more heavily weighted and corrected than brightness errors. Under certain conditions color component errors may be corrected entirely, as visualized with the aid of the desired color location $S_5$ in FIG. 2. The attainable desired color location $S'_5$ correlated with the desired color location $S_5$ is obtained in a manner such that a parallel is drawn through $S_5$ to the L* axis, which intersects the upper lateral surface 90 facing essentially upward in the direction of the L* axis of the correction color space 50, thereby defining the attainable desired color location $S'_5$. The attainable desired color location $S'_5$ is displaced relative to the piercing point (not shown) of a perpendicular from the desired color location $S_5$ on the upper lateral side 90 in a manner such that the color coordinates a* and b* of the attainable desired color location $S'_5$ coincide with those of the desired color location $S_5$, whereby an accepted additional deviation of the brightness coordinate L* relative to the choice of the piercing point of the perpendicular occurs. The color deviation vector 95 between the desired color location $S_5$ and the attainable desired color location $S'_5$ is longer than the perpendicular from $S_5$ to the upper lateral surface 90, but its components for a* and b* are zero. The control strategy according to the invention thus proposes that preferably an attempt should be made to attain the correction color space 50 beginning at a desired color location, by determining an attainable desired color location by displacing the actual desired color location parallel to the L* axis.

It is however, appropriate in this case to set limits for the brightness errors that appear to be acceptable and allow only a predetermined range for brightness errors between delta $L_{min}$ and delta $L_{max}$ and to always seek, in keeping with the above described strategies, the nearest point on the surface of the correction color space 50. In this manner, the compression of the L* coordinate may be combined with the search for a piercing point, perpendicular foot or corner point.

Such a case is visualized in FIG. 2 relative to the desired color location $S_6$, the position of which is represented spatially by an ashlar 96. In contrast to the strategy for the desired color location $S_4$, not the nearest corner 97 of the correction color space 50 is chosen as the attainable desired color location while trading a larger brightness error against smaller color component errors, but the point $S'_6$ on the surface of the correction color space 50 located on a plane extending parallel to the a* and b* coordinates at a distance from the desired color location $S_6$, defined by the greatest permissible brightness error and being at the shortest distance from the parallel to the L* axis through the desired color location $S_6$. The intersection of this plane with the parallel to the L* axis is identified in FIG. 2 by the symbol 98. The determination of the attainable desired color location $S'_6$ may also be effected by finding beginning at the intersection 98, in keeping with the strategy applied to the desired color location $S_3$, the foot of the perpendicular to the edge 99. Those skilled in the art will understand from the above discussion that the linear compression of the L* axis is possible not only separately, but also in combination with the constructions set forth relative to the desired color locations $S_2$, $S_3$ and $S_4$. The necessary calculations are performed by the computer of the data processing apparatus of the printing installation. The choice of the strategy to be applied depends on the one hand on the relative position of the desired color location S to the correction color space 50, and on the other, on the type of the measuring field and the objectives. It is convenient if the operator of the printing installation is able to predetermine in case of several possibilities the strategy to be used. For example, a color location $S_{62}$ as shown in FIG. 3 where the color space is a surface, can be correlated to an attainable color location which is determined along line 200 using the maximum brightness error. However, as can be seen in FIG. 3, the attainable color location is best attained by choosing a brightness error L which corresponds to the L-coordinate of the point $S_{62}$. Further, using the strategy for color location $S_6$ of FIG. 2 for location $S_{61}$ of FIG. 4 produces an attainable desired color location at point 300. However, a more desirable attainable color location is the point $S_{61}'$.

When the attainable desired color location is determined on the surface of the correction color space 50, it is used to regulate for minimum color deviation, wherein the density difference vector is obtained by the following equation:

$$\begin{bmatrix} \Delta D_C \\ \Delta D_M \\ \Delta D_y \end{bmatrix} = \begin{bmatrix} \frac{\partial D_C}{\partial L} & \frac{\partial D_C}{\partial a} & \frac{\partial D_C}{\partial b} \\ \frac{\partial D_M}{\partial L} & \frac{\partial D_M}{\partial a} & \frac{\partial D_M}{\partial b} \\ \frac{\partial D_Y}{\partial L} & \frac{\partial D_Y}{\partial a} & \frac{\partial D_Y}{\partial b} \end{bmatrix} \begin{bmatrix} \Delta L \\ \Delta a \\ \Delta b \end{bmatrix}$$

In this equation, $\Delta D_c$, $\Delta D_m$ and $\Delta D_y$ are the components of the full tone density variation vector. The components of the color deviation vector between the actual color location and the attainable desired color location are designated $\Delta L$, $\Delta a$ and $\Delta b$. The matrix containing the partial derivations of the full tone densities from the components of the color space is the aforementioned sensitivity matrix A.

The above discussed control strategies may also be applied to measuring fields in which less than three printing inks are printed. For the two-color fields, the correction color space is reduced to a parallelogram and for a single color field to a distance in the color space. The control strategies and calculations described above are applied analogously in such cases. It is merely necessary to set the correction vectors of the nonexisting colors to zero. Particularly in the case of two and single color fields, the desired color locations are practically always outside the planar or linear correction range. For this reason, the strategies discussed above for the determination of an attainable desired color location, are a precondition of optimum color tone regulation.

If the density boundary values are exceeded or not attained, it may occur that the actual color location is not within the correction color space. The subsequent control step is carried out nevertheless. The only precondition is that the linearization upon which the calculations are based is permissible and the sensitivity matrix known with sufficient accuracy.

It is mentioned finally that in case of a simultaneous regulation for different color locations, the residual errors may be distributed optimally over the color space. The necessary calculations are readily derived from the foregoing.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Process for the ink control or regulation of a printing machine with a colorimetric measuring system, whereby measuring fields on sheets printed by the printing machine are optically evaluated, in order to determine the color location of a measuring field in a coordinate system and to produce a regulating value for adjusting the color control elements of the printing machine by a coordinate comparison of a color deviation of the measuring field evaluated from a given desired color location, so that undesirable color deviations will become minimal on the sheet subsequently printed with a new ink control setting, comprising the steps of:

defining within the coordinate system a correction color space around a point defined by an actual color location measured on the measuring field using predetermined boundary densities and measured full tone densities;

replacing a predetermined desired color location situated outside the correction color space by an attainable desired color location on the boundary surface of the correction color space having a color deviation from the predetermined desired color location, with the components of said color deviation essential for the printing quality being minimal.

2. Process according to claim 1, wherein the color location on the surface of the correction color space having the smallest color deviation from the predetermined desired color location is chosen as the attainable desired color location.

3. Process according to claim 2, wherein said correction color space includes at least one lateral surface and a perpendicular is established onto an adjacent lateral surface of the correction color space from the predetermined desired color location and an intersection of the perpendicular with said adjacent lateral surface is used as the attainable desired color location.

4. Process according to claim 2, wherein the correction color space includes at least one lateral edge and a perpendicular is directed onto an adjacent lateral edge of the correction color space from the predetermined desired color location and an intersection of the perpendicular with said adjacent lateral edge is used as the attainable desired color location.

5. Process according to claim 2, wherein the correction color space includes at least one corner and a corner of the correction color space adjacent to the predetermined desired color location is used as the attainable desired color location.

6. Process according to claim 1, wherein an intersection of a parallel to a brightness coordinate axis of the coordinate system through the predetermined desired color location with the surface of the correction color space nearest to the predetermined desired color location is chosen as the attainable desired color location.

7. Process according to claim 6, wherein for the points located on the parallel to a brightness coordinate axis through the predetermined desired color location within a given brightness error range having a maximum and a minimum brightness, the nearest points on the surface of the correction color space are designated as the attainable desired color locations.

8. Process according to claim 7, wherein the nearest point on the surface of the correction color space is determined as the point on the parallel associated with a maximum brightness error within said given brightness error range.

9. Process according to claim 1, wherein for the points located on a parallel to a brightness coordinate axis through the predetermined desired color location within a given brightness error range having a maximum and a minimum brightness, the nearest points on the surface of the correction color space are designated as the attainable desired color locations.

10. Process according to claim 9, wherein the nearest point on the surface of the correction color space is determined as the point on the parallel associated with the greatest brightness error which appears to be acceptable.

11. Process according to claim 1, wherein an intersection of a color deviation vector between the actual color location and the predetermined desired color location with the surface of the color correction space is chosen as the attainable desired color location.

12. Process according to claim 1, wherein the color correction space is reduced to a surface in the color space and the attainable desired color location for two-color printing determined accordingly.

13. Process according to claim 1, wherein the color correction space is reduced to a straight line in the color space and the attainable desired color location for single color printing determined accordingly.

14. Process according to claim 1, wherein brightness error components of said color deviation are less heavily weighted in favor of smaller color component errors, by compressing L* according to L**=K.L*, with K being located between 0 and 1.

15. Process according to claim 3, wherein the color correction space is reduced to a surface in the color space and the attainable desired color location for two-color printing determined accordingly.

16. Process according to claim 3, wherein the color correction space is reduced to a straight line in the color space and the attainable desired color location for single color printing determined accordingly.

17. Process according to claim 3, wherein brightness error components of said color deviation are less heavily weighted in favor of smaller color component errors, by compressing L* according to L**=K—L*, with K being located between 0 and 1.

18. Process according to claim 4, wherein the color correction space is reduced to a surface in the color space and the attainable desired color location for two-color printing determined accordingly.

19. Process according to claim 4, wherein the color correction space is reduced to a straight line in the color space and the attainable desired color location for single color printing determined accordingly.

20. Process according to claim 4, wherein brightness error components of said color deviation are less heavily weighted in favor of smaller color component errors, by compressing L* according to $L^{**}=K \cdot L^{*}$, with K being located between 0 and 1.

21. Process according to claim 5, wherein the color correction space is reduced to a surface in the color space and the attainable desired color location for two-color printing determined accordingly.

22. Process according to claim 5, wherein the color correction space is reduced to a straight line in the color space and the attainable desired color location for single color printing determined accordingly.

23. Process according to claim 5, wherein brightness error components of said color deviation are less heavily weighted in favor of smaller color component errors, by compressing L* according to $L^{**}=K \cdot L^{*}$, with K being located between 0 and 1.

24. Process according to claim 8, wherein the color correction space is reduced to a surface in the color space and the attainable desired color location for two-color printing determined accordingly.

25. Process according to claim 7, wherein the color correction space is reduced to a straight line in the color space and the attainable desired color location for single color printing determined accordingly.

26. Process according to claim 7, wherein brightness errors are less heavily weighted in favor of smaller color component errors, by compressing L* according to $L^{**}=K \cdot L^{*}$, with K being located between 0 and 1.

27. Process according to claim 11, wherein brightness error components of said color deviation are less heavily weighted in favor of smaller color component errors, by compressing L* according to $L^{**}=K \cdot L^{*}$, with K being located between 0 and 1.

28. Process according to claim 12, wherein brightness error components of said color deviation are less heavily weighted in favor of smaller color component errors, by compressing L* according to $L^{**}=K \cdot L^{*}$, with K being located between 0 and 1.

29. Process according to claim 13, wherein brightness error components of said color deviation are less heavily weighted in favor of smaller color component errors, by compressing L* according to $L^{**}=K \cdot L^{*}$, with K being located between 0 and 1.

* * * * *